(12) United States Patent
Porcino

(10) Patent No.: US 6,469,665 B2
(45) Date of Patent: Oct. 22, 2002

(54) TIME OF ARRIVAL ESTIMATION POSITIONING SYSTEMS

(75) Inventor: Domenico G. Porcino, Horley (GB)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/833,848

(22) Filed: Apr. 12, 2001

(65) Prior Publication Data

US 2001/0035841 A1 Nov. 1, 2001

(30) Foreign Application Priority Data

Apr. 25, 2000 (GB) .............................................. 0009830

(51) Int. Cl.⁷ ................................................. G01S 1/24
(52) U.S. Cl. ........................ 342/387; 342/442; 342/457
(58) Field of Search ................................. 342/387, 442, 342/457, 464; 455/456, 457

(56) References Cited

U.S. PATENT DOCUMENTS

| | | | | |
|---|---|---|---|---|
| 5,396,250 A | * | 3/1995 | Tsui et al. ..................... 342/13 |
| 5,402,450 A | | 3/1995 | lennen ......................... 375/343 |
| 5,890,068 A | | 3/1999 | Fattouche et al. .......... 455/456 |
| 5,945,948 A | * | 8/1999 | Buford et al. ............... 342/457 |
| 5,970,414 A | | 10/1999 | Bi et al. ...................... 455/456 |
| 5,973,643 A | * | 10/1999 | Hawkes et al. ............. 342/457 |
| 6,084,547 A | * | 7/2000 | Sanderford et al. ......... 342/457 |
| 6,108,553 A | * | 8/2000 | Silventoinen et al. ....... 455/456 |
| 6,249,252 B1 | * | 6/2001 | Dupray ....................... 342/450 |

OTHER PUBLICATIONS

By J.H. Reed et al, Entitled: An Overview of the Challenges and Progress in Meeting the E–911 Requirement for Location Service, Published in the IEEE Communications Magazine, Apr. 1998, pp. 30–37.

By T.S. Rappaport et al, Entitled: Position Location Using Wireless Communications on Highways of the Future, Published in the IEEE Communicaitons Magazine, Oct. 1996, pp. 33–41.

Rappaport et al., "Position Location Using Wireless Communications on Highways of the Future", IEEE Communications Magazine, US, IEEE Service Center, vol. 34, No. 10, Oct. 1996, pp. 33–41, XP000694477.

* cited by examiner

Primary Examiner—Dao Phan
(74) Attorney, Agent, or Firm—Jack D. Slobod

(57) ABSTRACT

A method of determining the location of a mobile radio station comprises estimating the time of arrival of a radio signal travelling between mobile and fixed radio stations and deriving the location from the times of arrival, the method of estimating the time of arrival comprising a first stage of estimation which yields a coarse estimate, the coarse estimate being used to confine the scope of a second stage of estimation which yields a more precise estimate.

22 Claims, 3 Drawing Sheets

TIME OF ARRIVAL ESTIMATION POSITIONING SYSTEMS

The invention relates to a method of estimating the time of arrival of a radio signal and to an apparatus operating in accordance with the method, and has particular, but not exclusive, application to location systems for mobile radio devices.

Location systems for mobile radio have a variety of applications, for example for use in conjunction with emergency calls made from mobile telephones, as many people making emergency calls are unaware of their precise location, making it difficult for the emergency services to reach them. A variety of technologies have evolved for determining the location of a mobile radio. A review of location technology is contained in "An Overview of the Challenges and Progress in Meeting the E-911 Requirement for Location Service" by J. H. Reed et al, published in the IEEE Communications Magazine, Apr. 1998, pp. 30–37.

The location of a mobile radio may be determined by calculating its distance from three or more radio base stations situated at known locations. The location of the mobile radio will be at the intersection of circles (or spheres in three dimensions) about each base station, each circle having a radius corresponding to the distance of the mobile radio from that base station. Such distances may be readily determined from the propagation delay of a radio signal travelling between the mobile radio transmitter and base station receiver, assuming that radio signals propagate at the constant speed of light ($3 \times 10^8$ m/s). For example, a propagation delay of 10 $\mu$s will correspond to a distance of 3 km. The propagation delay can be determined by combining what is commonly referred to as a TOA (Time Of Arrival) measurement with knowledge of the time at which the radio signal was emitted from the transmitter.

A more practical method of determining propagation delay, in which knowledge of the emission time is not required, is to measure the difference in time of a signal emitted by the mobile radio transmitter arriving at each base station receiver. Instead of the circular location trajectory about each base station which results from an absolute TOA measurement, for each pair of base stations there is calculated a hyperbolic trajectory corresponding to the difference in distance of the mobile from each base station in the pair, and the location of the mobile radio will be at the intersection of these hyperbolae. Measurement of the difference in time of arrival is commonly referred to as a TDOA (Time Difference Of Arrival) measurement.

Methods of calculating location using TOA and TDOA measurements are discussed in "Position Location Using Wireless Communications on Highways of the Future" by T. S. Rappaport et al, published in the IEEE Communications Magazine, Oct. 1996, pp. 33–41.

Whether TOA or TDOA measurements are used, the accuracy of the location calculation is very dependent on the accuracy of the time of arrival measurements. In the present specification and claims the term "time of arrival" is used to encompass both TOA and TDOA.

Time of arrival can be measured by using the correlation properties of a pseudo-noise (PN) sequence, transmitted from a transmitter to a receiver. The correlation of the received signal with a replica of the transmitted signal will produce a peak in the correlation function when the two are synchronised. The peak can be detected even in the presence of severe distortion caused by multipath propagation and noise. Therefore, the problem of measuring time of arrival is equivalent to the accurate detection of the position of the peak in the correlation function between the distorted, received signal and a replica of the transmitted signal. It is known that correlation of the received signal with the replica can be performed in either the time domain or in the frequency domain, for example see T. S. Rappaport et al referenced above.

In emergency situations, the speed and accuracy of location calculation can be critical. The speed and accuracy of the location calculation is dependent on the speed and accuracy of the time of arrival measurement, which, in turn, depends on the processing power available and the algorithms used. In order to address a mass market, equipment cost should be low, so a low processing power requirement is important.

An object of the invention is to provide improvements in location systems for mobile radio by providing improvements in the time of arrival estimation.

According to one aspect of the invention there is provided a system for determining the location of a mobile radio station relative to radio base stations, comprising a plurality of radio base stations, each equipped to transmit a signal; and a mobile radio station equipped to receive the signal transmitted by each radio base station and having means for estimating the time of arrival of each received signal and means for computing the location of the mobile radio station from the estimated time of arrival of each received signal, wherein the means for estimating the time of arrival further comprises a means for making a first estimate of time of arrival having a first resolution and a means for making a second estimate of time of arrival having a second resolution, the first estimate of time of arrival contributing to defining the scope of the means for making the second estimate of time of arrival, and the second resolution being more refined than the first resolution.

According to a second aspect of the invention there is provided a system for determining the location of a mobile radio station relative to radio base stations, comprising a mobile radio station equipped to transmit a signal, a plurality of radio base stations, each equipped to receive the signal transmitted by the mobile radio station and having means for estimating the time of arrival of the received signal, and means for computing the location of the mobile radio station from the estimated time of arrival of the signal received at each radio base station; wherein the means for estimating the time of arrival further comprises a means for making a first estimate of time of arrival having a first resolution and a means for making a second estimate of time of arrival having a second resolution, the first estimate of time of arrival contributing to defining the scope of the means for making the second estimate of time of arrival, and the second resolution being more refined than the first resolution.

According to a third aspect of the invention there is provided a method of determining the location of a mobile radio station relative to radio base stations, comprising transmitting a signal from a plurality of radio base stations; receiving at a mobile radio station the signal transmitted by each radio base station; estimating the time of arrival of each received signal; and computing from the time of arrival estimates the location of the mobile radio station; wherein the time of arrival estimation further comprises making a first stage of estimation having a first resolution and which yields a first estimate of time of arrival, and making a second stage of estimation having a second resolution and which yields a second estimate of time of arrival; the first estimate of time of arrival contributing to defining the scope of the second stage of estimation, and the second resolution being more refined than the first resolution.

According to a fourth aspect of the invention there is provided a method of determining the location of a mobile radio station relative to radio base stations, comprising transmitting a signal from a mobile radio station; receiving at a plurality of radio base stations the signal transmitted by the mobile radio station; estimating the time of arrival of each received signal; and computing from the time of arrival estimates the location of the mobile radio station; wherein the time of arrival estimation further comprises making a first stage of estimation having a first resolution and which yields a first estimate of time of arrival; and making a second stage of estimation having a second resolution and which yields a second estimate of time of arrival; the first estimate of time of arrival contributing to defining the scope of the second stage of estimation, and the second resolution being more refined than the first resolution.

According to a fifth aspect of the invention there is provided an apparatus for estimating the time of arrival of a radio signal transmitted between a fixed radio station and a mobile radio station, comprising first means for making a first estimate of time of arrival, the first means having a first resolution, and second means for making a second estimate of time of arrival, the second means having a second resolution, the first estimate of time of arrival contributing to defining the scope of operation of the second means, and the second resolution being more refined than the first resolution. In one embodiment of the invention a PN sequence is transmitted from a radio base station and received by a mobile receiver. In the receiver two stages of time of arrival estimation are used.

In the first stage of estimation, a frequency domain calculation is performed as follows. The Fast Fourier Transform (FFT) of the received signal is calculated and multiplied by the FFT of a replica of the transmitted signal. The inverse FFT of the resulting product is calculated, which yields the correlation function of the received signal and the transmitted signal. A distinct peak in the correlation function corresponds to a strong similarity between the received signal and the replica, thereby indicating the reception of the transmitted sequence, and the position of the peak indicates the time of arrival of the sequence within the received signal. There may, in addition, be minor peaks resulting from multipath propagation, but these are processed separately and therefore can be ignored in the context of this invention.

For this first stage of estimation a coarse sampling interval is used, for example in the range of a quarter to a sixteenth of the period of a chip of the transmitted sequence. This results in only a coarse estimate of the time of arrival with a resolution equal to the sample interval, but the processing is fast to perform and requires only a low processing power.

After the position of a distinct peak in the correlation function has been located in the first stage of estimation, the received signal is processed in a second stage of estimation.

In the second stage of estimation, a time domain calculation is performed as follows. The cross correlation function of the received signal and a replica of the transmitted signal is calculated by calculating the cross correlation coefficient for successive shifts of the replica in the region of the peak in the correlation function detected during the stage one estimation, the shift increment being smaller than the sample interval used in stage one, until a peak in the correlation function has been identified. By using a small shift increment the position of the peak can be determined more precisely than in the first stage of estimation. This peak indicates the time of arrival of the transmitted sequence at the mobile receiver.

The second stage of estimation results in a higher resolution estimate of time of arrival than stage one. In general, the stage two estimation is more processor intensive than stage one, but the second stage of estimation is confined to the region of the coarse estimate detected in the first stage of estimation. The combined result of stages one and two is an estimate of time of arrival which can be more accurate and/or faster and/or less processor intensive than a pure frequency domain estimation or a pure time domain estimation. The desired trade off between these benefits may be selected by the equipment designer.

PN sequences are also transmitted from additional radio base stations and the mobile receiver calculates the time of arrival of each sequence that it can detect. The sequences from different radio base stations can be distinguished by use of different sequences and/or different frequencies.

The estimated times of arrival of the sequences from each radio base station are then used by the mobile receiver for the calculation of receiver location using TOA or TDOA system formulae that are well known in the art. To enable the location of the receiver to be calculated, signals must be received from at least three radio base stations.

In a second embodiment of the invention a sequence is transmitted from a mobile radio and received by radio base stations. In this case the stage one and two estimation of times of arrival, and the subsequent calculation of mobile radio location, is performed within the fixed network rather than in the mobile radio. In order to calculate the location of the mobile radio, the signal transmitted by the mobile radio must be received by at least three radio base stations.

A benefit of the first embodiment, in which the mobile radio calculates its own location, is that mobile radios having location capability can be readily introduced with zero or little upgrading of the fixed network, and any number of mobile radios can provide location information to their users without creating a load on the network.

A benefit of the second embodiment, in which the calculation of the mobile radio location is performed in the fixed network, is that a mobile radio location service can be introduced with zero or little upgrading of the mobile radio.

Examples of applications where the invention may be beneficially applied are: handheld or vehicular positioning devices such as GPS (Global Positioning System) receivers; handheld or vehicular mobile radio communication devices, such as mobile telephones, with a positioning capability; and handheld or vehicular radio data communication devices, such as mobile internet terminals, with a positioning capability.

The invention will now be described, by way of example, with reference to the accompanying drawings wherein.

Figure 1:
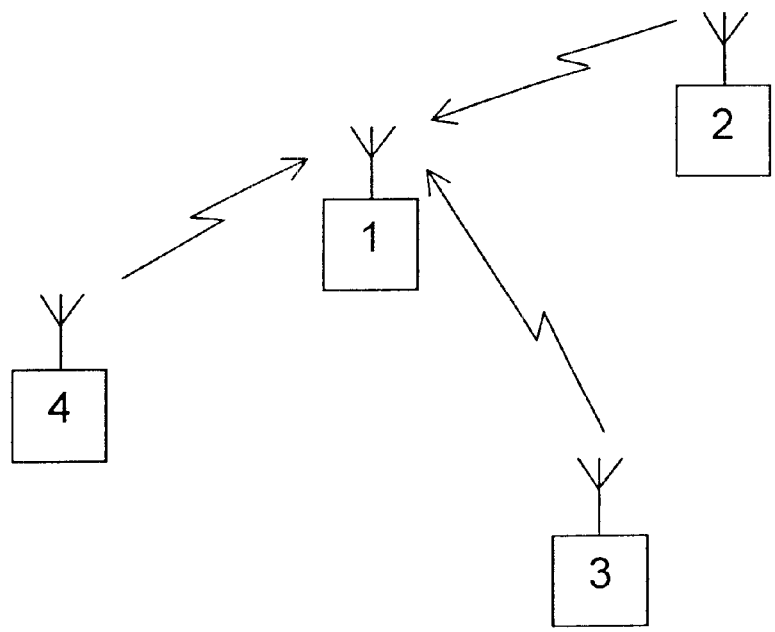
FIG. 1 is a sketch illustrating a mobile radio system consisting of a mobile radio roaming within radio range of three fixed radio base stations.

Referring to FIG. 1, a mobile radio 1 is illustrated receiving radio signals from three fixed radio base stations 2,3 and 4. The base stations 2,3 and 4 are tuned to transmit on nominally the same frequency. As the mobile radio moves around in use, it may be in range of more or fewer base stations. Using time of arrival location methods, accurate determination of location will be possible only where the mobile radio is within range of three or more base stations.

Figure 2:
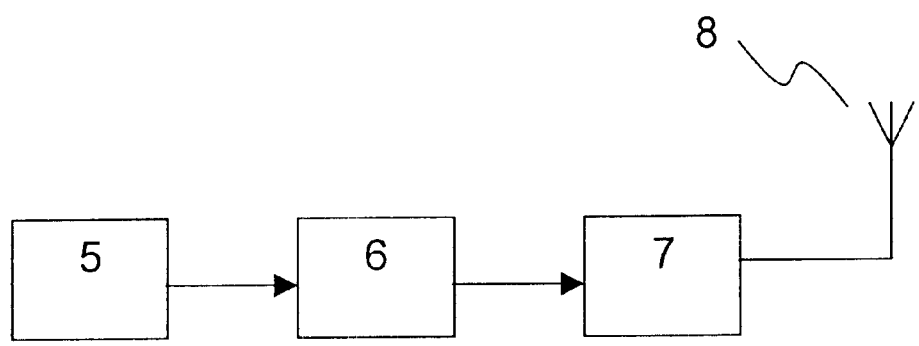
FIG. 2 is a block diagram showing the relevant elements of each of the radio base stations shown in FIG. 1.

Referring to FIG. 2, each fixed radio base station 2,3 and 4 comprises a PN sequence generator 6, the PN sequence being input to a transmitter 7, and the radio transmitter signal being broadcast via an antenna 8. The PN sequence is transmitted at predetermined intervals. The time of transmission of the PN sequence from each transmitter must be controlled to be equal within very tight limits, so the PN sequence generator 6 is driven by an accurate clock 5 which comprises a GPS (Global Positioning System) receiver. The PN sequence length is 0.666 ms, comprising 2560 chips at a rate of 3.84 Mchips per second.

Figure 3:
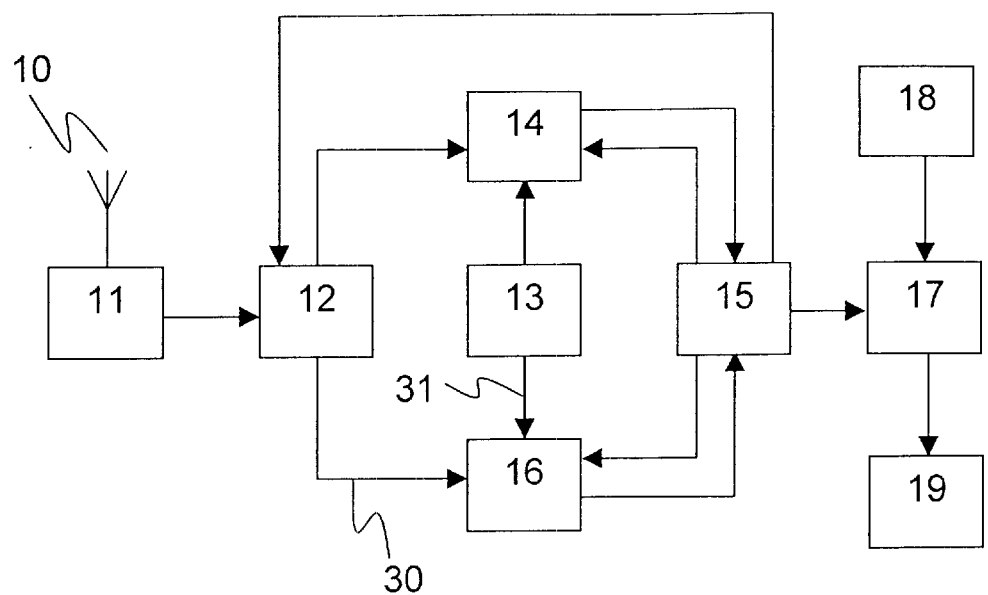
FIG. 3 is a block diagram showing the relevant elements of the mobile radio shown in FIG. 1.

Referring to FIG. 3, the radio signals are received by an antenna 10 and receiver 11 combination. When the user of the mobile radio requires to know his position, he indicates his requirement to a controller 15 via the user interface (not shown), whereupon the controller 15 enables an input buffer 12 to store the received radio signal. The controller 15 then enables a frequency domain correlator 14 to read a 0.666 ms portion of the stored signal from the input buffer 12 and to read a replica of the transmitted signal from a replica store 13, and to calculate the cross correlation function of the two signals. The cross correlation function is calculated by the frequency domain correlator 14 by calculating the Fast Frequency Transform (FFT) of the portion of the stored signal, calculating the FFT of the replica signal, multiplying the two FFTs together, and calculating the inverse FFT of the product.

The process of reading 0.666 ms portions of the received radio signal stored in the input buffer 12 and correlating the portions with the replica of the transmitted signal stored in the replica store 13 is repeated until a distinct peak in the cross correlation function is detected.

Figure 5:
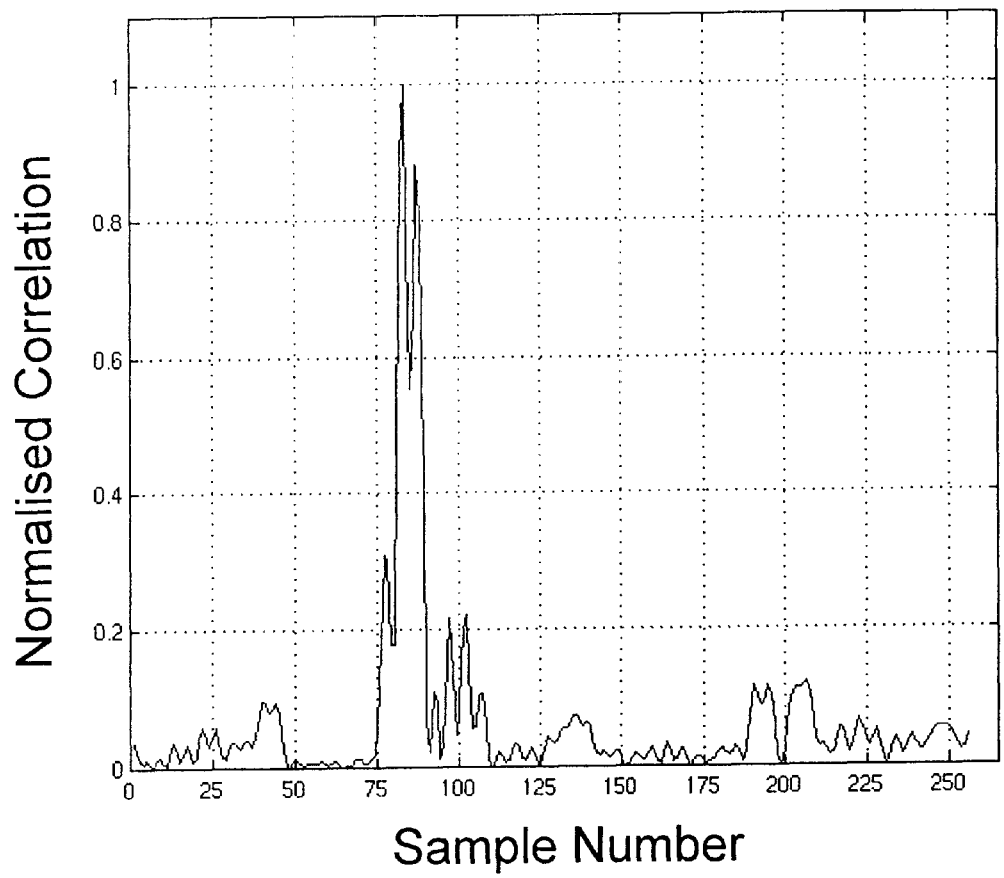
FIG. 5 is an example of a correlation function.

FIG. 5 shows an example of a cross correlation function where the peak is distinct.

The position of the peak indicates the approximate time of arrival of the PN sequence relative to the stored signal.

The accuracy of the calculation of time of arrival is dependent on the chip rate and sampling interval used in calculating the FFT. With a chip rate of 3.84 Mchips per second the chip duration is 0.26 µs. Using a sampling interval of a quarter of a chip duration, the maximum time resolution achievable is 0.065 µs, which corresponds to a maximum distance resolution of 19.54 m. If the sampling interval is one sixteenth a chip duration, the maximum time resolution achievable would be 0.016 µs, which corresponds to a maximum distance resolution of 4.88 m.

When a distinct peak in the correlation function is detected by the frequency domain correlator 14, the position of the peak relative to the stored signal is reported to the controller 15, and the controller 15 enables a time domain correlator 16 to read a portion of the stored signal from the input buffer 12, and to read a replica of the transmitted signal from the replica store 13, and to calculate in the time domain the cross correlation function of the two signals according to well known correlation formula. The portion of the stored signal selected to be read from the input buffer 12 by the time domain correlator 16 is selected from the region of the estimated time of arrival reported by the frequency domain correlator, and extends for the duration of the PN sequence plus a margin at both ends. A suitable margin is 10 chips.

Figure 4:
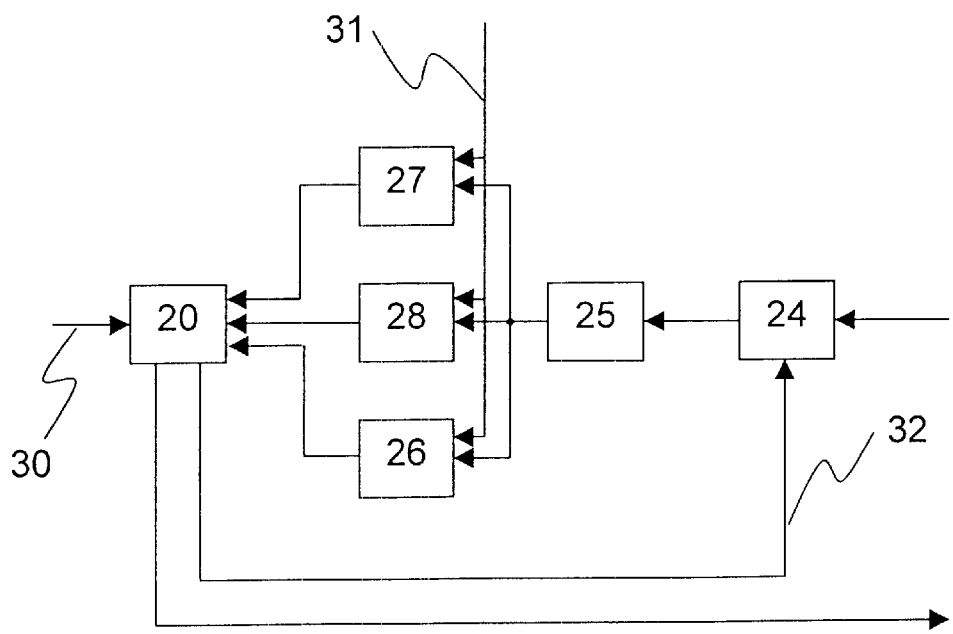
FIG. 4 is a block diagram showing in more detail the elements of a time domain correlator used in the mobile radio shown in FIG. 1.

Referring to FIG. 4, the operation of the time domain correlator 16 in more detail is as follows. The portion of the stored signal is read from the input buffer 12 into a correlation register 20 by means of an input 30. The replica of the transmitted signal is read from the replica store 13 on parallel connections 31 into an Early buffer 26, a Late buffer 27 and a Precise buffer 28. The replica is clocked out of these three buffers by means of an NCO (Numerically Controlled Oscillator), thereby generating an Early, Late and Precise phase of the replica. The frequency and phase of the NCO 25 is controlled by an NCO Adjuster 24. The three phases of the replica are delivered to the correlation register 20. Within the correlation register, the stored signal portion is correlated with the three phases of the replica. A feedback connection 32 from the correlation register 20 to the NCO Adjuster 24 enables the NCO Adjuster to adjust the frequency and phase of the NCO 25 until the Precise phase replica is synchronised with the stored signal portion, this synchronisation being indicated by a distinct peak in the correlation function.

When a distinct peak in the correlation function is detected by the time domain correlator 16, the position of the peak relative to the stored signal is reported to the controller 15. The position of the peak indicates the accurate time of arrival of the PN sequence relative to the stored signal.

The accuracy with which the position of the peak in the correlation function may be determined is dependent on the resolution of the NCO. For example, choosing a driving frequency for the NCO of 30.72 MHz, and using a 24-bit NCO, the minimum increment in the output frequency provided by the NCO is:

$$NCOstep = \frac{InputFrequency}{2^{Number\ of\ bits\ NCO}} = \frac{30.72 \cdot 10^6}{2^{24}} = 1.83105\ Hz$$

The NCO will be set to produce at its output the sampling frequency. For a chip rate of 3.84 MHz, sampling four times per chip will require a sampling frequency of 15.36 Msamples per second. The minimum resolution can be expressed in terms of distance as:

$$Speed\ of\ Light \cdot \left[\frac{1}{SamplingFrequency} - \frac{1}{SamplingFrequency + NCOstep}\right] =$$

$$3 \cdot 10^8 \left[\frac{1}{15.36 \cdot 10^6} - \frac{1}{15.36 \cdot 10^6 + 1.83105}\right] = 2.3281 \mu m$$

Therefore, this method allows a deeply sub-chip step and consequently a minimum resolution of sub-millimetric precision.

Each fixed radio base station 2, 3 and 4 transmits a difference PN sequence. In practice, but not shown in the Figures for clarity, the replica store 13 provides a replica of each transmitted signal, and the correlation processing within the frequency domain correlator and the time domain correlator is duplicated for each sequence that might be received by the mobile radio, thereby yielding a correlation function peak for each sequence. The position of each of these peaks is reported to the controller 15.

The controller 15 calculates the time difference between each peak and reports the time differences to a location calculator 17.

The location calculator uses the time differences to calculate the location of the mobile radio using well known formulae and a data base of fixed radio base station locations 18. After the location has been calculated it is presented to the user of the mobile radio on a display 19.

The sequence and estimation parameters used in the above description are illustrative but not definitive.

Optionally, each PN sequence may be received more than once and the position of the correlation peak calculated for each sequence received, from which an average time of arrival may be calculated having further improved accuracy.

Although an embodiment of the invention has been described using a time domain calculation in the second stage of estimation, a frequency domain calculation could alternatively be used, for example a MUSIC or ESPRIT algorithm, having a higher resolution than the frequency domain calculation in the first stage of estimation.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of time of arrival estimation and the art of position location systems and which may be used instead of or in addition to features already described herein.

What is claimed is:

1. A system for determining the location of a mobile radio station relative to radio base stations, comprising
   a plurality of radio base stations, each equipped to transmit a signal; and
   a mobile radio station equipped to receive the signal transmitted by each radio base station and having means for estimating the time of arrival of each received signal and means for computing the location of the mobile radio station from the estimated time of arrival of each received signal, wherein the means for estimating the time of arrival comprises
      a means for making a first estimate of time of arrival having a first resolution and
      a means for making a second estimate of time of arrival having a second resolution, the first estimate of time of arrival contributing to defining the scope of the means for making the second estimate of time of arrival, and the second resolution being more refined than the first resolution.

2. Apparatus for estimating the time of arrival of a radio signal transmitted between a fixed radio station and a mobile radio station comprising
   first means for making a first estimate of time of arrival, the first means having a first resolution, and
   second means for making a second estimate of time of arrival, the second means having a second resolution; the first estimate of time of arrival contributing to defining the scope of operation of the second means, and the second resolution being more refined than the first resolution,
   wherein the first means uses a frequency domain calculation.

3. A system for determining the location of a mobile radio station relative to radio base stations, comprising a mobile radio station equipped to transmit a signal, a plurality of radio base stations, each equipped to receive the signal transmitted by the mobile radio station and having means for estimating the time of arrival of the received signal, and means for computing the location of the mobile radio station from the estimated time of arrival of the signal received at each radio base station; wherein the means for estimating the time of arrival comprises the apparatus of claim 2.

4. A system as claimed in claim 1, characterised in that the means for making the first estimate of time of arrival comprises means (14) for multiplying a Fast Fourier Transform of a received signal by a Fast Fourier Transform of a replica of a transmitted signal and determining an Inverse Fast Fourier Transform of the resulting product.

5. A system as claimed in claim 1, characterised in that the means for making the second estimate of time of arrival comprises means (16) for performing the time domain correlation of a received signal with a replica of a transmitted signal.

6. A method of determining the location of a mobile radio station relative to radio base stations, comprising
   transmitting a signal from a plurality of radio base stations;
   receiving at a mobile radio station the signal transmitted by each radio base station;
   estimating the time of arrival of each received signal; and
   computing, from the time of arrival estimates, the location of the mobile radio station;
   wherein the time of arrival estimation further comprises
      making a first stage of estimation having a first resolution and which yields a first estimate of time of arrival; and
      making a second stage of estimation having a second resolution and which yields a second estimate of time of arrival; the first estimate of time of arrival contributing to defining the scope of the second stage of estimation, and the second resolution being more refined than the first resolution.

7. A method of determining the location of a mobile radio station relative to radio base stations, comprising
   transmitting a signal from a mobile radio station;
   receiving at a plurality of radio base stations the signal transmitted by the mobile radio station;
   estimating the time of arrival of each received signal; and
   computing, from the time of arrival estimates, the location of the mobile radio station;
   wherein the time of arrival estimation further comprises
      making a first stage of estimation having a first resolution and which yields a first estimate of time of arrival; and
      making a second stage of estimation having a second resolution and which yields a second estimate of time of arrival; the first estimate of time of arrival contributing to defining the scope of the second stage of estimation, and the second resolution being more refined than the first resolution, and
   wherein the first stage uses a frequency domain calculation.

8. A method as claimed in claim 6, characterised in that the first stage of estimation comprises multiplying (14) a Fast Fourier Transform of a received signal by a Fast Fourier Transform of a replica of a transmitted signal and determining an Inverse Fast Fourier Transform of the resulting product.

9. A method as claimed in claim 6, characterised in that the second stage of estimation comprises performing a time domain correlation (16) of a received signal with a replica of a transmitted signal.

10. Apparatus as claimed in claim 2, characterised in that the first means for making a first estimate of time of arrival comprises means for multiplying a Fast Fourier Transform of a received signal by a Fast Fourier Transform of a replica of a transmitted signal and determining an Inverse Fast Fourier Transform of the resulting product.

11. Apparatus for estimating the time of arrival of a radio signal transmitted between a fixed radio station and a mobile radio station comprising first means for making a first estimate of time of arrival, the first means having a first resolution, and second means for making a second estimate of time of arrival, the second means having a second resolution; the first estimate of time of arrival contributing to defining the scope of operation of the second means, and the second resolution being more refined than the first resolution, characterised in that the second means for making a second estimate of time of arrival comprises means for performing a time domain correlation of a received signal with a replica of a transmitted signal.

12. Apparatus sa claimed in claim 11, characterised in that the means for performing the time domain correlation comprises an NCO.

13. A system as claimed in claim 3, characterised in that the means for making the first estimate of time of arrival comprises means for multiplying a Fast Fourier Transform of a received signal by a Fast Fourier Transform of a replica of a transmitted signal and determining an Inverse Fast Fourier Transform of the resulting product.

14. A system for determining the location of a mobile radio station relative to radio base stations, comprising a mobile radio station equipped to transmit a signal, a plurality of radio base stations, each equipped to receive the signal transmitted by the mobile radio station and comprising means for estimating the time of arrival of the received signal, comprising means for making a first estimate of time of arrival having a first resolution and means for making a second estimate of time of arrival having a second resolution, the first estimate of time of arrival contributing to defining the scope of the means for making the second estimate of time of arrival, and the second resolution being more refined than the first resolution, and means for computing the location of the mobile radio station from the estimated time of arrival of the signal received at each radio base station;

charactetised in that the means for making the second estimate of time of arrival comprises means for performing the time domain correlation of a received signal with a replica of a transmitted signal.

15. A method as claimed in claim 7, characterised in that the first stage of estimation comprises multiplying a Fast Fourier Transform of a received signal by a Fast Fourier Transform of a replica of a transmitted signal and determining an Inverse Fast Fourier Transform of the resulting product.

16. A method of determining the location of a mobile radio station relative to radio base stations, comprising transmitting a signal from a mobile radio station;

receiving at a plurality of radio base stations the signal transmitted by the mobile radio station;

estimating the time of arrival of each received signal; and computing, from the time of arrival, estimates of the location of the mobile radio station;

wherein the time of arrival estimation further comprises making a first stage of estimation having a first resolution and which yields a first estimate of time of arrival; and making a second stage of estimation having a second resolution and which yields a second estimate of time of arrival; the first estimate of time of arrival contributing to defining the scope of the second stage of estimation, and the second resolution being more refined than the first resolution, characterised in that the second stage of estimation comprises performing a time domain correlation of a received signal with a replica of a transmitted signal.

17. The apparatus of claim 2, wherein the second means uses a time domain calculation.

18. The system of claim 1, wherein the first means uses a frequency domain calculation.

19. The system of claim 18, wherein the second means uses a time domain calculation.

20. The method of claim 6, wherein the first stage uses a frequency domain calculation.

21. The method of claim 18, wherein the second stage uses a time domain calculation.

22. The method of claim 7, wherein the second stage uses a time domain calculation.

* * * * *